May 10, 1938.  S. L. ADELSON  2,116,550
FLOW RESPONSIVE DEVICE
Filed Jan. 16, 1936
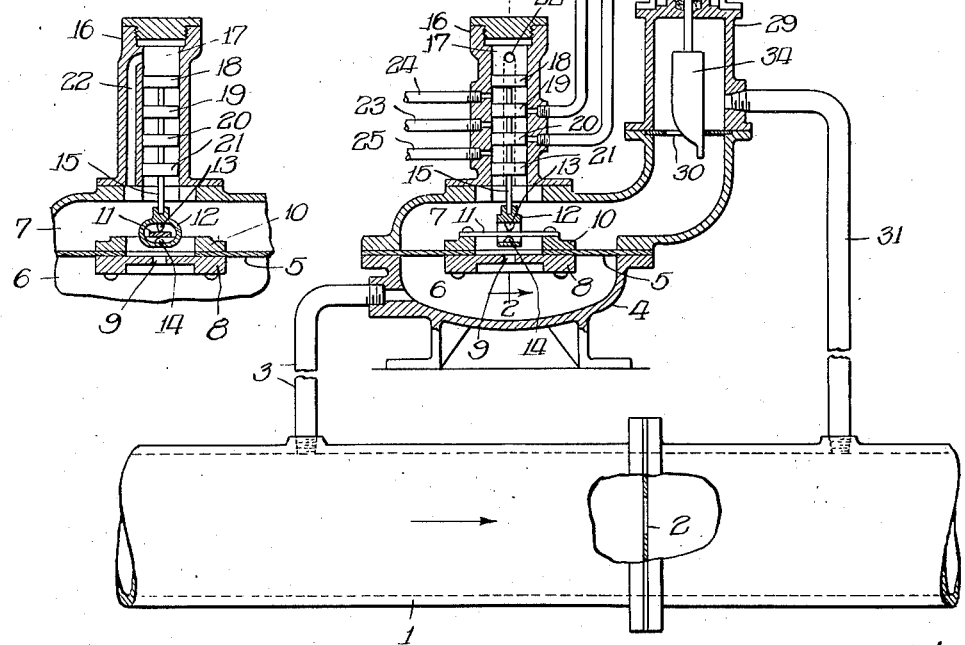
Inventor:
Samuel L. Adelson.
By Cromwell, Greist & Warden
attys Patented May 10, 1938

2,116,550

UNITED STATES PATENT OFFICE 2,116,550

FLOW-RESPONSIVE DEVICE

Samuel L. Adelson, Chicago, Ill., assignor, by mesne assignments, to Infilco Inc., a corporation of Delaware Application January 16, 1936, Serial No. 59,346

5 Claims. (Cl. 73—194)

The present invention relates to energy differential responsive operating mechanism and has particular reference to an improved device for operating in accordance with the flow of a fluid as in the case of a liquid flowing through a conduit.

A principal object of the invention is the provision of an improved operating mechanism responsive to changes in the flow of a fluid.

An additional object is to provide an improved device for metering and indicating the flow of liquid through a pressure conduit.

A further object of the invention is the provision of such an apparatus utilizing a differential pressure-creating device, a differential pressure responsive member actuated in accordance with the differential pressure created by said device, a complementary acting device operable to establish a predetermined equilibrium with said differential responsive member, and operating or indicating mechanism responsive to the position of said complementary acting device.

A still further object is the provision of a device of the type described which is sensitive and responsive to small changes in flow and wherein the positioning of an indicating and/or governing member is effected by means that permit considerable motion and the application of ample power to effect operation with accuracy against considerable resistance.

These and other objects and advantages will appear upon a consideration of the following specification and by reference to the accompanying drawing, in which—

Fig. 1 is a view, partly in section and somewhat diagrammatic, of a device constructed in accordance with my invention;

Fig. 2 is a fragmentary sectional side view of part of the device shown in Fig. 1; and Fig. 3 is a fragmentary sectional view of a modification of the device shown in Fig. 1.

In the drawing, the invention is shown in connection with a pressure conduit 1 through which a liquid flows in the direction of the arrow in Fig. 1. At a suitable point in the conduit is mounted a differential pressure-creating device 2, indicated as being a rigid plate provided with the usual restricted central opening. It will be understood that other conventional differential pressure-creating devices, such as a Venturi tube, may be employed in place of the member 2.

To the upstream side of the differential pressure-creating device 2 is connected a pipe 3, and the latter leads to a differential pressure responsive member indicated generally at 4. This member consists of a split casing having mounted therein a flexible centrally orificed diaphragm 5 which divides the casing into a lower compartment 6 and an upper compartment 7. Attached to the lower side of the diaphragm 5 is a clamping plate 8. The central portion of this plate is provided with an orifice 9 of predetermined size, through which water from the compartment 6 may pass into upper compartment 7. The upper side of diaphragm 5 is provided with a clamping member 10, the latter having a transverse bar 11 which passes through a ring 12 in the manner shown in Fig. 2. The ring-shaped member 12 has upper and lower pins 13 and 14, respectively, which are in loose contact with the cross member 11, thereby forming a flexible connection between piston rod 15 attached to the top of the ring and diaphragm 5.

Mounted at the top of the compartment 7 is a pilot valve 16 which has an internal cylindrical chamber 17. Piston rod 15 extends upwardly within this chamber and has four vertically spaced piston heads 18, 19, 20 and 21. A conduit 22 connects the upper portion of chamber 17 above the top piston 18 with chamber 7, so as to equalize the liquid pressure at these two points.

The chamber 17 is provided with a pressure line 23 at a point between the central pistons 19 and 20 and with an upper waste line 24 between pistons 18 and 19 and a lower waste line 25 between pistons 20 and 21.

Pilot valve 16 is connected with a hydraulic motor indicated generally at 26 by a pipe 27 which extends from the upper portion of the motor to the pilot valve at a point normally obstructed by piston 19. A second pipe 28 extends from the lower portion of the hydraulic motor 26 to the pilot valve 16 at a point normally obstructed by the piston 20.

Below the hydraulic motor 26 is mounted a pressure chamber 29 which communicates with upper chamber 7 of the differential pressure device 4 through an orificed partition 30. A pipe 31 connects chamber 29 with the conduit 1 on the downstream side of the member 2.

The hydraulic motor 26 is provided with a long piston rod 32 having a lower end extending into chamber 29 and an upper end extending out the top of the motor as shown in Fig. 1, the motor having suitable stuffing boxes at its upper and lower ends for allowing reciprocal movement of the piston rod without leakage of water. Within the motor 26 and between the connections of pipes 27 and 28 the piston rod 32 has rigidly mounted thereto a piston 33.

A shaped plunger 34 is attached to the lower end of piston rod 32 in such a manner as to extend into the orifice of partition 30. Plunger 34 is shaped in such a manner as to vary the effective size of the orifice in partition 30 in accordance with the position of the rod or stem 32. As shown in the drawing the plunger decreases in size toward its bottom so as to increase the size of the orifice in partition 30 when the stem 32 is raised, and vice versa.

The upper end of piston rod 32 has attached to it a cable or string 44 which extends upwardly about a sheave 45, the latter being secured to a rotatable shaft 46 carrying hand 47 of an indicating device. A suitable scale 48 is mounted adjacent hand 47 and is calibrated to convey the desired information with respect to movement of hand 47, thereby indicating some function of the flow through conduit 1. A weight 49 is attached to the free end of cable 44 to insure proper traction of the cable with sheave 45.

A second cable 50 also may be attached to the upper end of piston rod 32 for the purpose of operating a suitable chemical feeder indicated generally at 51 in accordance with some function of the flow through conduit 1, this cable being passed over sheave 45 in the manner described in connection with cable 44.

Operation of the device depends upon the differential pressure set up between pipes 3 and 31 by the member 2. Flow through the conduit is accompanied by a by-pass flow through pipe 3, compartment 6, orifice 9, compartment 7, the variable orifice in partition 30, chamber 29 and pipe 31 back to the conduit. If the head loss due to friction through the circuit described is ignored, then the differential pressure between the connections of pipes 3 and 31 with the conduit may be divided into two parts, namely, that across the constant size orifice 9 and that across the variable orifice in partition 30.

The weight of the diaphragm 5 and the elements which move with it is a predetermined value so as to offer a certain resistance to the lifting effect of the by-pass liquid. The differential pressure across orifice 9 acting on the under side of the diaphragm 5 tends to move the diaphragm upwardly. Opposing this tendency is the weight of the diaphragm, clamping plates 8 and 10, and other elements which move with the diaphragm. For each fixed value of the weight of diaphragm 5 and the members which are attached to it there will be a differential pressure across orifice 9 of such value that the tendency of the differential pressure to move the diaphragm upwardly is exactly counterbalanced by the weight of the moved elements. If the flow through conduit 1 and consequently through the by-pass is reduced from this state of equilibrium, the resulting reduction in the differential pressure across orifice 9 will allow a downward movement of the diaphragm 5. Thereupon pistons 18, 19, 20 and 21 will move downwardly. Conversely, an increase in the flow through conduit 1 and the by-pass will cause upward movement of the diaphragm 5 against the weight of the diaphragm and its attached parts by reason of the increased differential across orifice 9.

When the pistons move downwardly due to a decreased flow, piston 19 uncovers pipe 27 and piston 20 uncovers pipe 28. Pressure water will enter pilot valve 16 through line 23 and will pass through pipe 28 to the under side of piston 33 in the hydraulic motor 26. This will cause upward movement of piston 33, the water above the piston passing out of the cylinder through pipe 27, the pilot valve 16 between pistons 18 and 19, and waste line 24. Upward movement of piston 33 will move plunger 34 upwardly in the orifice of partition 30, thereby increasing the effective area of this orifice and allowing a greater flow therethrough.

Upward movement of the pistons 18 to 21 uncovers pipe 27 to the pressure line 23 and line 28 to the waste line 25, pressure water thereupon flows from line 23 into the upper part of cylinder of hydraulic valve 26 and forces the piston 33 downwardly, water below the piston 33 passing to waste through line 28, the chamber of pilot valve 16 between pistons 20 and 21, and line 25. The downward movement of piston 33 causes the plunger 34 to be pressed downwardly with respect to the orifice in partition 30, thereby decreasing the effective area of this orifice.

When the system is in equilibrium the differential pressure across the orifice 9 is exactly counteracted by the weight on diaphragm 5. This differential pressure is of constant magnitude and may be designated $Pc$. The differential across the orifice of the member 2 in conduit 1 will vary with the flow through the conduit and may be designated $Pf$. The variable differential across the variable orifice in partition 30 may be designated $Pv$. Hence, ignoring friction $$(1) \qquad Pf = Pc + Pv$$

Where flow through the conduit 1 has increased, $Pf$ will increase to $P_1f$ and there likewise will be an increase in the flow through orifice 9 and the orifice in partition 30. Diaphragm 5 will move upwardly as will pistons 18 to 21, resulting in a downward movement of plunger 34 and a decrease in the area of the orifice in partition 30. To re-establish equilibrium the differential across the orifice in partition 30 must be of a value $P_1v$ so as to satisfy the equation $$(2) \qquad P_1f = P_1v + Pc$$

As $Pc$ is constant and as the area of the orifice 9 is constant, the by-pass flow at equilibrium is constant. Therefore, there is only one lower value of the area of the variable orifice in partition 30 which will increase $Pv$ to $P_1v$ to satisfy Equation (2) when the flow through conduit 1 has increased to produce the differential $P_1f$. Since the area of the variable orifice in partition 30 depends upon the position of plunger 34, it follows that with a proper contour of the plunger 34 there is only one position of the upper end of the piston rod 32 that will correspond to the increased rate of flow through conduit 1.

If there has been a decrease in the flow rate from the initial equilibrium, $Pf$ will decrease to $P_2f$ and there will be a decrease in the by-pass flow orifice 9 and the orifice in partition 30, which will result in a decreased differential across these orifices. Diaphragm 5 and pistons 18 to 21 will move downwardly upon this decreased flow and plunger 34 will be moved upwardly, the area of the orifice in partition 30 thereby being increased. To re-establish equilibrium, the differential across the orifice in partition 30 must be of a value $P_2v$ which will satisfy the equation $$(3) \qquad P_2f = P_2v + Pc$$

As before, the by-pass flow at equilibrium is constant and there is only one greater value of the area of the variable orifice in partition 30 which will decrease $Pv$ to $P_2v$ to satisfy Equation (3) when the flow through conduit 1 has decreased to produce the differential $P_2f$. The upper end of the piston rod 32 therefore will assume a position corresponding to the decreased rate of flow.

The contour of plunger 34 may be made according to the kind or degree of motion and/or the function to be indicated or other result to be produced. For example, the plunger may be of such form as to produce a movement of the upper end of the piston rod 32 in direct proportion to the rate of flow through conduit 1 irrespective of the relation of the flow to the differential pressure produced in this flow by the member 2.

It will be noted that the rate of flow through the by-pass is always the same when the apparatus is in equilibrium, that is, when plunger 34 has assumed the proper complementary position in relation to the flow through orifice 9. As a result, the loss due to friction in pipes 3 and 31 is constant. This loss is minimized by keeping the connections short and of ample cross section. There is a similar constant loss through the orifice 9 which is minimized by making the weight of diaphragm 5 and associated parts as small as may be depended upon to move the pilot valve. The total of these effects fixes the minimum flow at which the apparatus will be operative, but this in turn may be made low by increasing the area of the diaphragm or the derived differential.

In the modification of the device shown in Fig. 3 the diaphragm 5 is placed in vertical position, and the orifice 9 is positioned in auxiliary chamber at the lower portion of the member 4. To prevent sagging of the diaphragm and consequent misalignment of parts, as well as loss in sensitivity due to distortion of the diaphragm, support is provided by a band or ribbon 52 of thin and very flexible metal, the band being clamped at the top of the member 4 between the edges of the castings forming the diaphragm casing and to the diaphragm or its attachments at or near the center thereof. It is desirable that a suitable pin attachment be made at each end of the ribbon to prevent slippage. In this embodiment of the device the weight of the clamping plates and diaphragm is not material as effecting the lower limit of operation but lightness is desirable as far as is consistent with the necessary rigidity and strength. The upstream pressure of the orifice 9 as shown in Fig. 3 is imposed upon one side of the diaphragm 5 and the downstream pressure of the orifice is imposed on the opposite side of the diaphragm. A bell crank 53 is pivotally mounted in the chamber 7 as shown at 54. The vertical arm of the bell crank 53 is provided with a socket 55 against which impinges a push rod 56, the latter being affixed to the diaphragm 5 in the manner shown in the drawing. The horizontal arm of the bell crank is provided with an end weight 57 which reciprocates in an auxiliary chamber 58. This weight 57 provides the constant force opposing the constant differential pressure on the diaphragm 5 and functions in a manner similar to that described for clamping plates 10 and 8 of Fig. 1. Weight 57 is preferably made slidable on the horizontal arm of bell crank 53. Between the weight 57 and the pivot 54 is pivotally attached a link 59 which secures the horizontal arm of the bell crank to piston rod 15 of the pilot valve 16, the link 59 also being pivotally attached to the rod 15. Pressure against the upstream side of diaphragm 5 causes the movement of the latter to be transferred through arm 56, bell crank 53 and link 59 to the piston rod 15. A decrease in pressure results in an opposite movement of the element 5 due to action of the weight 57.

It will be seen that the device described in the drawing includes a differential pressure-creating device which is dependent for its effect upon the rate of flow through conduit 1. This effect is transferred to and actuates a differential pressure-responsive device which by means of pilot valve 16 and the hydraulic motor 26 actuates a complementary acting device operable to restore equilibrium conditions in the apparatus regardless of flow through conduit 1, the action of this complementary mechanism being utilized also to control an indicating or operating means. The differential pressure-responsive device 4 is dependent in its action upon the rate of flow through the by-pass. The complementary device which comprises the shaped plunger 34 is dependent in its action upon the device 4. The action of the complementary acting device may be expressed by some function of the flow through the conduit 1, since the position of the plunger 34 is determined by a flow through the conduit even though the flow through the by-pass is the same under all conditions after restoration of equilibrium therein. As stated before, the action of this complementary device may be employed to meter the flow through the conduit. Or, it may be utilized to control a chemical feeder to proportion the amount of chemical to the rate of flow. Many other operative functions are possible with the structure. Likewise, the device may be applied to other situations where differential energy conditions are present. The structure itself obviously is susceptible of changes and alterations without departing from the scope of the invention and all such changes and variations are intended to be included in the appended claims.

What I claim is:

1. An apparatus for metering fluid flow comprising, in combination, a device for creating a pressure differential from the flow, a by-pass conduit around said device for a by-pass flow created by said pressure differential, a movable member adapted to throttle said by-pass flow, and means governed by said by-pass flow for actuating said movable member to throttle said by-pass flow to a constant value, said movable member by its position manifesting the rate of said fluid flow.

2. An apparatus for metering a fluid flow comprising a conduit for said fluid flow, a pressure differential deriving device therein, a by-pass conduit for a by-pass flow around said device, means operable upon a change in said fluid flow tending to throttle said by-pass flow to a substantially constant value in response to varying values of said pressure differential, and a member controlled by said means and manifesting by its position the rate of fluid flow in said conduit.

3. In a device of the type described, a conduit for flow of a fluid, a differential pressure-creating device in said conduit, means connecting with said conduit and providing a by-pass flow around said device, a differential pressure member having an orifice of constant size in said by-pass and operative directly by the flow through said by-pass, a complementary acting device having a variable size orifice in said by-pass, and means responsive to the flow through said differential pressure member to vary the size of said last named orifice upon variations in the flow through said constant size orifice to maintain the flow through said by-pass substantially constant.

4. In a device of the type described, a conduit for flow of a liquid, a differential pressure creating device in said conduit, means communicating with said conduit and providing a by-pass flow around said differential pressure creating device, a differential pressure responsive member actuated by the flow through said by-pass, a complementary acting device having a variable size orifice in said by-pass, means responsive to the action of said differential pressure responsive member for varying the size of said last named orifice upon variations in flow through said by-pass to maintain the flow substantially constant, and said responsive means by its position manifesting the rate of flow in said conduit.

5. In a device of the type described, a conduit for flow of a fluid, a differential pressure-creating device in said conduit, means providing a by-pass flow around said device, a differential pressure member having an orifice of constant size in said by-pass and operative directly in accordance with the flow through said by-pass, a complementary acting member having a variable size orifice in said by-pass, means responsive to the flow through said differential pressure member to vary the size of said last named orifice upon variations in the flow through said constant size orifice to maintain the flow through said by-pass substantially constant, and operative means responsive to said complementary device.

SAMUEL L. ADELSON.